United States Patent
Mann

(10) Patent No.: US 7,301,126 B2
(45) Date of Patent: Nov. 27, 2007

(54) PANEL ELEMENT WITH A HEATING LAYER

(75) Inventor: Detlef Mann, Gunzenhausen (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/503,124

(22) PCT Filed: Feb. 27, 2003

(86) PCT No.: PCT/FR03/00632

§ 371 (c)(1),
(2), (4) Date: Aug. 9, 2004

(87) PCT Pub. No.: WO03/071964

PCT Pub. Date: Sep. 4, 2003

(65) Prior Publication Data

US 2005/0221062 A1    Oct. 6, 2005

(30) Foreign Application Priority Data

Feb. 27, 2002   (DE) .............................. 102 08 552

(51) Int. Cl.
*B60L 1/02*   (2006.01)
(52) U.S. Cl. ...................... 219/203; 219/202; 219/219; 219/541

(58) Field of Classification Search ................ 219/203, 219/522, 541, 543; 52/171.2; 338/306–309
See application file for complete search history.

(56) References Cited

U.S. PATENT DOCUMENTS 3,790,745 A    2/1974   Levin
5,023,403 A    6/1991   Eckardt et al.

FOREIGN PATENT DOCUMENTS

| DE | 198 60 870 | 7/2000 |
|---|---|---|
| EP | 0 451 608 | 10/1991 |
| FR | 1 104 595 | 11/1955 |

OTHER PUBLICATIONS

U.S. Appl. No. 10/558,472, filed Nov. 23, 2005, Mann.

*Primary Examiner*—Tu Ba Hoang
*Assistant Examiner*—Vinod Patel
(74) *Attorney, Agent, or Firm*—Oblon, Spivak, McClelland, Maier, & Neustadt, P.C.

(57) ABSTRACT

A panel element with a toughened pane, provided with a total surface coating, which is electrically conducting and heated by applying an electrical voltage by electrodes. A partial zone of the coating is electrically separated by a separating line. Specifically, an inner surface zone of the coating is separated electrically, by at least one peripheral separating line, from an external edge region of the coating, and the electrodes are placed inside the surface zone surrounded by the peripheral separating line.

21 Claims, 3 Drawing Sheets

PANEL ELEMENT WITH A HEATING LAYER

The invention relates to a panel element with a toughened glass pane provided with a total surface coating, which is electrically conducting and heated by applying an electric voltage by means of electrodes, and in which a partial zone of the coating is electrically separated by a separating line. Heated coatings of this type applied to glass generally serve to remove condensation and ice from the panes used as transparent panes, so that they can be seen through without difficulty.

The basic features are disclosed in document DE-A1-40 11 541, in the form of a toughened pane with an alarm and electrical heating. Using a separating line traced by a laser beam, a partial zone of the electrically conductive heated coating of this pane is electrically separated from the main surface zone of the coating. The partial zone is used as a sensor for detecting breakage of the toughened pane in question. The latter may be incorporated into a laminated pane or into an insulating glazing element. Preferably, a system of layers is used, which is able to withstand a high thermal load and which can be deposited onto the surface of the pane well before the latter is toughened.

Document DE-A1-36 44 297 presents a plurality of examples for dividing the heated coatings of a vehicle windshield. The divisions may thus be made by areas which are not surface-coated and/or by cuts made mechanically or by a laser beam. They serve to establish and to conduct in a suitable manner a current flow inside the coated face and have to guarantee as uniform a current density as possible in the faces in question.

The operation of these heated layers requires relatively high electrical voltages. It is necessary to provide reliable electrical insulation, in particular on the edge of the pane in question, which may be coated over its entire surface.

In another panel element (DE-B-2 113 876) the electrically conductive and heated coating does not extend to the edge of the panel, such that a spacer for an insulating glazing unit can be directly adhesively bonded to the (uncoated) edge region of the pane without particular precautions. The electrical conductors supplying the electrodes are taken through the holes and sealed in the spacer.

It is known that it is possible to produce, by various methods, uncoated areas on a substrate which is otherwise completely coated. By means of masks placed during the coating operation, the substrate may be kept free from the outset in the coated zones. To remove a coating on the partial zones of a substrate, the coating may again be removed by mechanical abrasion, by chemical means or, for example, by laser beams.

In the panel element known from document EP-A2-0 989 781 together with the solution proposed by document DE-U-299 23 417, the coating extending up to the edge of the pane is masked by an insulating layer which covers it, such that there is at least no electrically conducting connection to the spacer. The latter may in addition consist of a material with high electrical resistance, for example plastic. Likewise, adhesives with high electrical resistance can optionally be employed. In these models, the conductors supplying the electrodes are taken between the coated surface of the pane and the spacer or through holes in the spacer.

Document DE-A1-196 44 004 describes a laminated pane for automobiles, whose lamination comprises a polymer film, which is in turn provided with a thermally insulating and electrically conductive coating which however is sensitive to corrosion. A narrow edge strip of the coating on the film is separated from the main surface zone of the coating by means of a separating line, so as to prevent the propagation of corrosive effects starting from the edge of the film up to the field of vision of the pane. The separating line is cut in so that it is visually imperceptible in the coating, by means of a laser beam. The laser beam is adjusted so that it is absorbed only by the material of the coating and that it only destroys the latter in a zone which is narrowly limited locally by the heat released, while the support film itself remains intact.

The subject of the invention is to provide a panel element which is further improved with a heated layer, which is also but not solely suitable as an independent heated panel element without having the function of a window pane.

According to the invention, this objective is achieved in that an inner surface zone of the heated coating is electrically separated, by at least one peripheral separating line, from an external edge region of the coating and in that the electrodes are placed inside the surface zone surrounded by the separating line. The characteristics of the secondary claims propose advantageous improvements to this objective.

On separating the actual heated field of an edge region of the coating using at least one peripheral separating line, reliable electrical insulation of the edge of the panel element is first of all provided. When operating at relatively high voltages, two or more parallel peripheral separating lines can also be provided. In principle, this allows such a heated panel element to operate at the voltage of the respective national network (for example 110 or 230 V).

Of course, it is possible—in a manner known per se—also to provide, on a panel element according to the invention, several current paths, for possible connection independent of one another, in order to be able to connect or disconnect the heating power in stages, as required.

The length and the width of the current path or current paths, together with the surface conductivity (in ohms per unit surface area) of the layer system used are determining factors for the electrical power absorbed and the heating power of the panel element. Depending on the respectively available or predetermined service voltage, it is possible to adjust different heating powers within broad limits by designing the current path, for which powers the maximum permissible temperature will also depend on the field of use of the completed panel element. For example, if direct contact by the user is not possible or unacceptable, the temperatures may then go well over 50° C. However, it is naturally necessary to prevent the adhesive layers, which stick to the pane to be coated, for example the adhesive films of a laminated window, from being damaged by the temperatures reached during normal operation.

Such panel elements may be fitted into or onto buildings, onto walls or be incorporated therein, instead of the usual heated bodies. To this end, they do not necessarily have to be made in the form of windows, but can be made in the form of mirrors, decorative surfaces, etc. If required, it is also possible to use such panel elements generally for surface production of heat in technical equipment, for example household appliances, where their low total height and their very easy to clean smooth surface may have great advantages.

Although, even in an application of the panel element as flat heated element without a window function, the current flow does not necessarily have to be uniformly distributed throughout, it is however, advantageous to adjust it in this way at least approximately so as to prevent local overheating and damage to the heated coating. Although, with layer systems deposited by modern methods, it is possible to count on a very even thickness over the whole layer, conversely, it is barely possible to produce coating thicknesses which are deliberately different, and consequently with different surface resistances, over a predetermined area of a substrate.

When manufacturing heated panel elements without a window function, if need be, it is possible to do without a nonreflective treatment for the actual conductive layer which, for example, consists of silver or of another conducting metal, which makes it possible, on the one hand, to simplify the current supply (the normal dielectric nonreflective layers are either nonconducting or very poorly conducting), and on the other hand, to obtain decorative surface effects. The exact determination of suitable materials for the system of heated layers is however left to the understanding of a person skilled in the art, who is responsible for calibrating the desired heating power.

In addition, one or more temperature sensors can be provided in order to detect the actual temperature of the panel element. Such temperature sensors may even take the form of current limiters (for example thermistors, whose electrical/ohmic resistance increases when the temperature increases). As a variant, a separate switching component may be provided in order to disconnect the heating current should the panel element threaten to overheat, and which may be controlled by a temperature sensor.

As in the prior art in this field, in the panel element according to the invention, as a variant, the separate peripheral edge zone may also take the form of a breakage detector for setting off an alarm, if it is separated into one location and if electrodes for a standby current are provided on each side of the separating line. Such standby current circuits may operate at such low electrical powers or voltages that there is no resultant hazard.

Other details and advantages of the subject of the invention will be provided by the drawings of exemplary embodiments and by their following detailed description.

In these drawings with a simplified representation,

Figure 1:
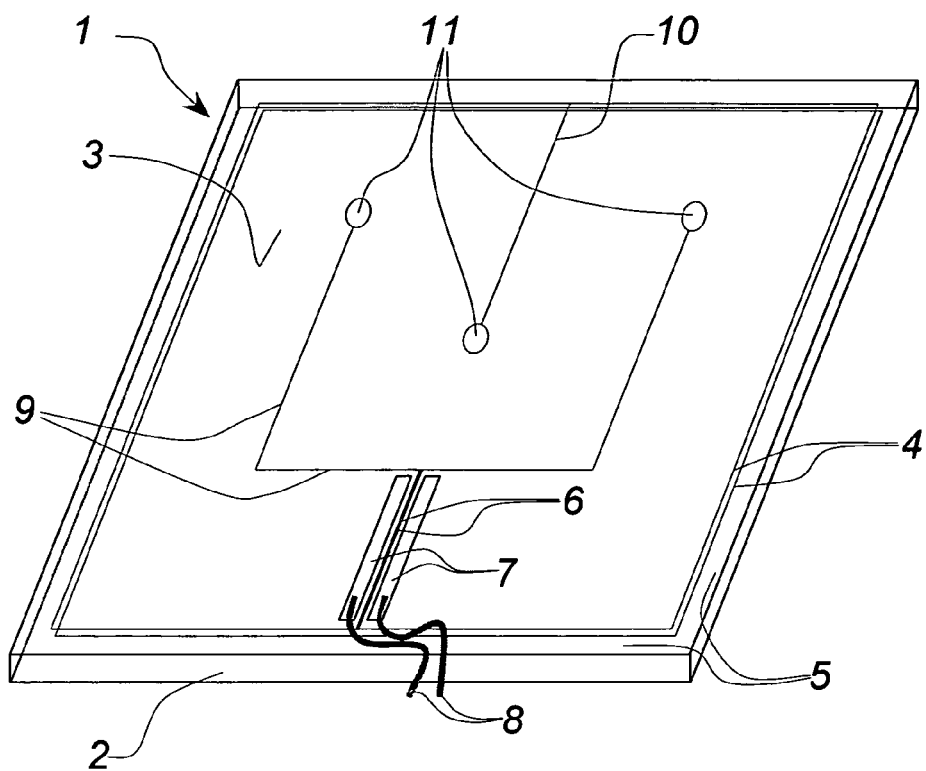
FIG. 1 is a perspective view of a panel element with a heated coating and divided by separating lines.

According to FIG. 1, a panel element 1 comprises a toughened pane 2, a first main face—in this case the upper face—of which is completely covered with an electrically conductive coating 3. The coating 3 may, but does not however have to be, optically transparent. Preferably, it consists of a layer system withstanding a high thermal load, comprising at least one metal layer, which has been deposited before toughening the pane 2.

Along the edge of the pane 2, two fine separating lines 4, drawn around the periphery parallel to each other at a short distance—1 to 2 cm—from this edge are made in the coating. A peripheral outer edge strip 5 thus formed is electrically separated from the larger remaining part of the coated surface. It forms an edge insulation for the panel element 1.

Starting from the two peripheral separating lines 4, another pair of parallel separating lines 6 extend at an angle over a certain length in the surface of the coating 3. On each side of these separating lines 6, a strip-shaped electrode 7 is provided, which is electrically connected to the coating 3 each time. Using cables 8, the two electrodes 7 can be connected to an electrical voltage.

Other separating lines 9 are provided, in a manner known per se, in order to determine a defined path for the heating current through the face of the coating 3. The separating line 9, which is overall U-shaped, is directly connected to the two separating lines 6, the two arms of the U being parallel to the separating lines 6 and to the two lateral sides of the panel element 1. The straight separating line 10 extends from the separating lines 4 between the two arms of the U of the separating line 9. At the free ends of the separating lines 9 or 10 in the surface, recesses 11, which must avoid excessive current densities in the region of these ends, are provided in the surface of the coating. The separating lines 9 and 10 form, like the peripheral separating lines 4, breaks with a high electrical resistance in the coating, through which no current can flow.

Overall, this results in a current path which is relatively long and relatively narrow, which uses the entire surface of the coating 3 surrounded by the peripheral separating lines 4. To establish a current density which is as uniform as possible at the transitions between the coating 3 and the electrodes 7, the electrodes 7 are of a length which is substantially equal to the width of the current path at this location.

Only one exemplary embodiment from a plurality of possible and usable designs for the separating lines defining the current path is shown here. It is also possible, without major additional expense—for example by means of a robot—to use for example the laser in order to trace curved separating lines in the coating. Other examples can be inferred from the prior art discussed in the introduction.

Figure 2:
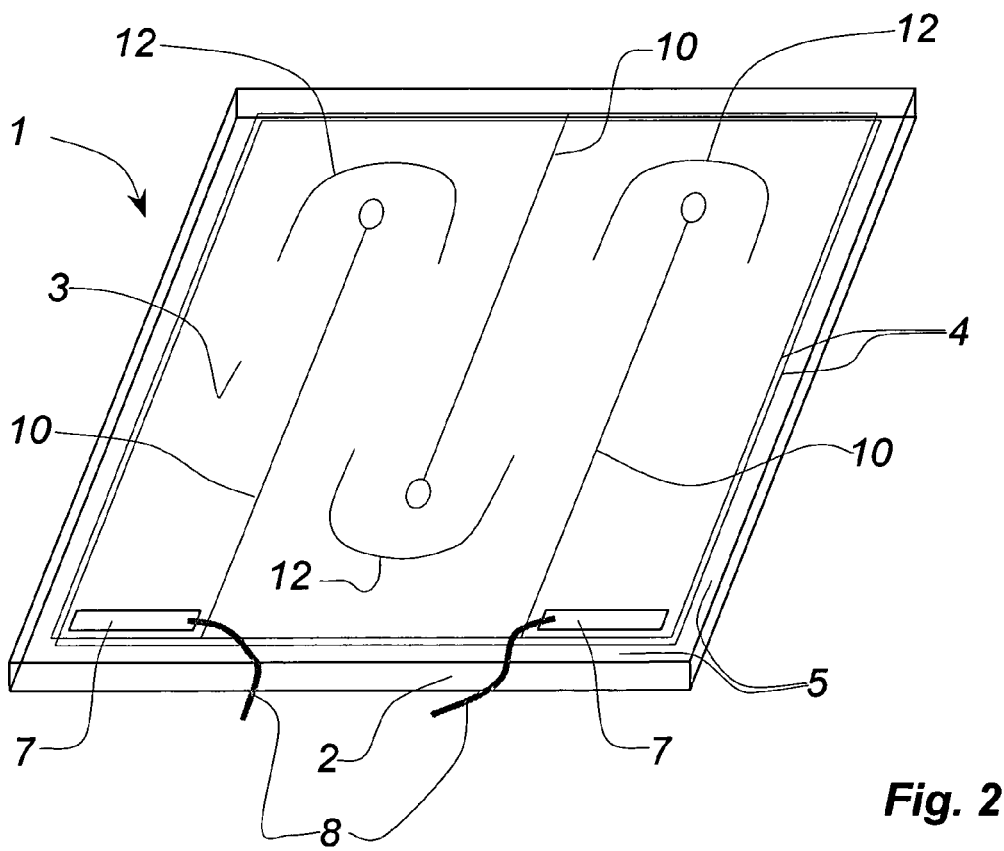
FIG. 2 shows an identical view of a variant of the panel element.

The embodiment of the panel element 1 according to FIG. 2 is distinguished from the first embodiment mainly by the modified arrangement of the two electrodes and by the path of the current flow. Here, the two electrodes 7 are located close to the separating lines 4 parallel to one of the sides of the pane 2. This arrangement of the electrodes 7 close to one side of the pane is less visible than the embodiment illustrated in FIG. 1. The current path between the electrodes has a sinuous path determined by the separating lines 10. In the deflection regions, curved separating or guiding lines 12, which are again designed to avoid current peaks at the free ends of the straight separating lines 10, are additionally provided. Of course, such guiding lines 12 may also be used in the embodiment of FIG. 1. Furthermore, several parallel guiding lines can be provided. The most suitable design for each case of such current guiding lines and separating lines 9 and 10 must be determined on a case by case basis by means of tests.

Figure 4:
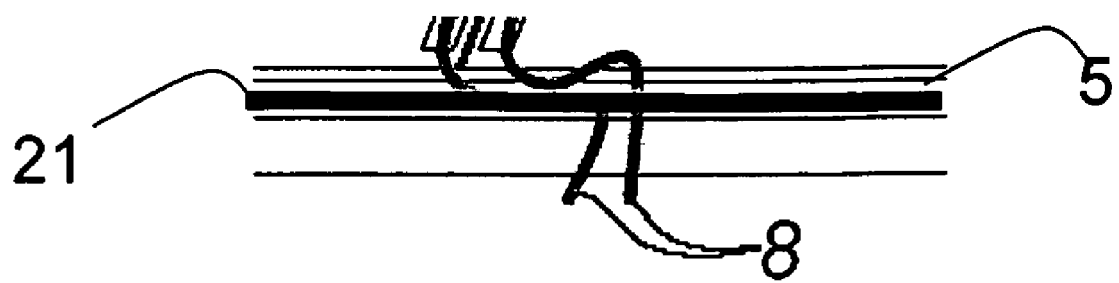
FIG. 4 shows a section of a panel element with a single pane and a spacer.

Panel elements of the type shown in FIGS. 1 and 2 are suitable, for example for being fitted into insulating glazing units, where an associated spacer 21 must simply be adhesively bonded to the edge region 5. See FIG. 4. The cables 8 will then—in a manner also known per se—be made in the form of flat cables or printed films with conducting sections leading outward, with no electrical contact with the edge region between the spacer and the surface of the pane, therefore in the adhesive bonding plane. The second pane of the insulating glazing unit forms rear masking for the coating.

Similarly, such panel elements may be directly suspended in front of a wall, or incorporated therein, without being provided in advance with a rear coating, where there is also a guarantee that there is no hazard due to the electrical operating voltage.

Figure 3:
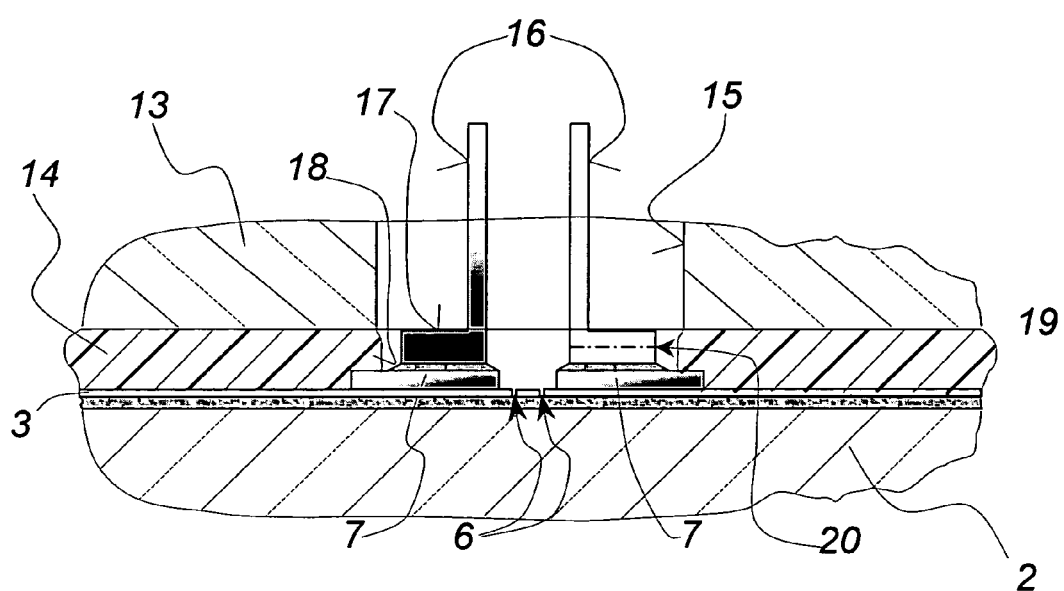
FIG. 3 shows a section through the electrical contact region of one embodiment, in which the panel element of FIG. 1 is part of a laminated pane.

In another variant, which is shown in sketch form in FIG. 3, the pane 2 of FIG. 1 has been incorporated into a laminated pane, the second rigid glass or plastic pane 13 of which is flat assembled, in the normal manner, by means of an adhesive sheet or layer 14 to the toughened pane 2. In the cross section through the coating 3, the arrangement of the two separating lines 6 between the electrodes 7 can be seen, which electrodes are applied directly to the coating 3. As a variant to this arrangement, the electrodes may also be placed below the coating, that is to say before depositing the latter on the surface of the pane. They can be made in the form of thin metal films or else strips to be baked (when toughening the pane 2) from a conducting screen-printing paste. Suitable electrode embodiments, which may also be called collecting rails, are described many times in the prior art.

The second pane 13 and the adhesive layer 14 are provided with a small recess, or a small hole, 15 in the region of the electrode. The recess serves for bringing out the electrical contacts for the electrodes 7. Two contact leads 16 are fastened to the latter by means of feet 17 to be soldered and of soldering points 18. The contact plugs of the contact leads 16 are inside the recess 15 and allow a suitable connection plug (not shown) to be engaged, which must naturally be suitably protected mechanically against extraction.

Such an embodiment of the electrical contact of the heated layer towards the outside is particularly well suited for use of the panel element as a heated plate without a window function. Naturally, in the embodiment according to FIG. 3 as in FIGS. 1 and 2, the pair of electrodes 7 may be connected to a permanent cable which may, by means of a plug at its free end, be connected to a current source.

The electrodes 7 are themselves opaque and if need be they are, however, visible through the uncoated side of the pane 2. They may then form decorative elements, for example—as a variant to the simple strip shape illustrated in the drawing—represent a company or manufacturer's logo. Furthermore, some color effects can also be obtained by coloring the conducting screen-printing paste, preferably used for producing the electrodes.

Of course, the region of electrical contact may also, if necessary, be masked from sight by suitable means, for example by applying or overprinting an opaque decorative pattern or else by using a very dark glass compound for the toughened pane 2. As a general rule, the latter will form the surface of the panel element turned toward the space to be heated. On replacing any maskings, we have here, in the region of the electrodes, and of the contact leads, an electrically nonconductive opaque coating 19 between the coated surface of the pane 2 and the heated coating 3, which has already been printed on the glass surface and baked during toughening before depositing the coating 3. As a variant of the representation, it is possible to apply the two electrodes 7 directly to the opaque coating 9—for example by printing two strips of a conducting screen-printing paste—and only then, as has already been indicated, depositing the conductive coating 3 over the opaque coating 19 and the electrodes 7. Above all, this has the advantage that, after depositing the mechanically fragile coating 3, a new material does not again have to be applied to the coated surface. Furthermore, good adhesion of the electrodes 7 to the glass surface is guaranteed.

For delivery, the recess 15 is closed off with a sealed, durably elastic, stopper (not shown), which may optionally allow the placement and the removal of the aforementioned plug, but which will prevent the spread of moisture and dirt to the electrodes 7 and to the coating 3.

In the representation according to FIG. 3, it would be possible to combine one of the contact leads 16 with a temperature sensor, for example one with a self-temperature-regulating resistor, which locally detects the actual temperature of the panel element, or of the coating, and which optionally limits the electric power absorbed to harmless values. Such a temperature sensor could advantageously be incorporated into a soldering foot 17 of one of the contact leads 16, as indicated by mixed line 20 in the foot of the right-hand contact lead 16, such that it is directly located in the current flow of the heating current circuit.

The invention claimed is:

1. A panel element comprising:
   a toughened glass pane, provided with a total surface coating, which is electrically conducting and heated by applying an electric voltage to electrodes,
   wherein an inner surface zone of the coating is electrically seperated and defined separated, by two separating lines provided in parallel along the entire periphery of the coating, from an external edge region of the coating, and
   wherein the electrodes are placed inside the inner surface zone surrounded by the separating lines and connections of the electrodes do not contact the external edge region of the coating.

2. The panel element as claimed in claim 1, wherein the two separating lines include two or more parallel peripheral separating lines.

3. The panel element as claimed in claim 1, wherein current flow is conducted each time between two of the electrodes along a predetermined route, which is obtained by a locally insulating division of the coating in the surface zone surrounded by separating lines.

4. The panel element as claimed in claim 1, wherein electrical resistance of the heated coating is adjustable and configured to operate at one of a plurality of voltages such that a predetermined temperature is not exceeded on applying the operating voltage to the electrodes.

5. The panel element as claimed in claim 4, wherein the total surface coating is not transparent.

6. The panel element as claimed in claim 1, wherein the coating includes a system of layers configured to withstand a high heat load.

7. The panel element as claimed in claim 1, wherein the connections of the electrodes are taken toward an outside above the external edge region thereby being electrically insulated therefrom.

8. The panel element as claimed in claim 1, further comprising a plate laminated to a coated side of the pane.

9. The panel element as claimed in claim 1, further comprising a spacer for an insulating glazing unit adhesively bonded to the electrically separated external edge region of the coating.

10. The panel element as claimed in claim 8, further comprising at least one recess provided in a plate assembled to the coated pane for bringing out the connections for the electrodes.

11. The panel element as claimed in claim 10, further comprising plug connections for the electrodes placed in the at least one recess.

12. The panel element as claimed in claim 1, further comprising a temperature sensor configured to detect an actual temperature of the heated coating.

13. The panel element as claimed in claim 12, further comprising a switching element to be controlled by the temperature sensor to cut or reduce heating current should a predetermined temperature threshold be exceeded.

14. The panel element as claimed in claim 1, wherein the separated external edge region of the coating is separated by the two separating lines and is used as a current path.

15. The panel element as claimed in claim 1, wherein at least a region of the electrodes is hidden from view by a mask as a visual masking.

16. The panel element as claimed in claim 15, wherein the visual masking is obtained by using an opaque glass compound for the toughened pane.

17. The panel element as claimed in claim 16, wherein the visual masking is made by an opaque decorative element.

18. The panel element as claimed in claim 17, wherein the opaque decorative element is placed flat between the surface of the pane and the heated coating.

19. The panel element as claimed in claim 1, wherein the electrodes are made by depositing and baking an electrically conducting screen-printing paste, before or after depositing the heated coating.

20. The panel element as claimed in claim 19, wherein the electrodes form visible decorative elements.

21. The panel element as claimed in claim 20, plug connections configured to engage electrical connection conductors and, connected to the electrodes.

* * * * *